US00RE50254E

(19) United States
(12) Reissued Patent
Park et al.

(10) Patent Number: US RE50,254 E
(45) Date of Reissued Patent: Dec. 31, 2024

(54) ELECTRODE ASSEMBLY INCLUDING ELECTRODE PLATES WITH ELECTRODE PLATE EXTENSIONS

(71) Applicant: LG Chem, Ltd., Seoul (KR)

(72) Inventors: Su-Han Park, Daejeon (KR); Min-Suk Kang, Daejeon (KR); In-Jung Kim, Daejeon (KR); Han Kim, Daejeon (KR); Yong-Tae Lee, Daejeon (KR)

(73) Assignee: LG Energy Solution, Ltd., Seoul (KR)

(21) Appl. No.: 17/398,678

(22) Filed: Aug. 10, 2021

Related U.S. Patent Documents

Reissue of:
(64) Patent No.: 10,381,628
Issued: Aug. 13, 2019
Appl. No.: 15/614,759
Filed: Jun. 6, 2017

(30) Foreign Application Priority Data

Jun. 7, 2016 (KR) ..... 10-2016-0070419

(51) Int. Cl.
*H01M 50/54* (2021.01)
*H01M 10/04* (2006.01)
(Continued)

(52) U.S. Cl.
CPC ..... *H01M 50/54* (2021.01); *H01M 10/0525* (2013.01); *H01M 10/0583* (2013.01); *H01M 50/46* (2021.01); *H01M 50/538* (2021.01); *H01M 10/045* (2013.01); *H01M 10/0585* (2013.01); *H01M 10/0587* (2013.01); *Y02E 60/10* (2013.01); *Y02P 70/50* (2015.11)

(58) Field of Classification Search
CPC .. H01M 50/54; H01M 10/0525; H01M 50/46; H01M 50/538; H01M 10/0583; H01M 10/0585; H01M 10/045; Y02E 60/10; Y02P 70/50
See application file for complete search history.

(56) References Cited

U.S. PATENT DOCUMENTS

2005/0100784 A1* 5/2005 Yageta ..... H01M 50/178 429/162
2005/0130035 A1* 6/2005 Inada ..... H01M 2/266 429/161
(Continued)

FOREIGN PATENT DOCUMENTS

JP 7-335246 A 12/1995
JP H07335246 A 12/1995
(Continued)

*Primary Examiner* — Minh Nguyen
(74) *Attorney, Agent, or Firm* — Lerner David LLP

(57) ABSTRACT

Disclosed is an electrode assembly in which a plurality of electrode plates are stacked so that a separator is interposed between a positive electrode plate and a negative electrode plate, wherein each of the electrode plates includes an electrode tab protruding outwards at one side thereof for coupling with an electrode lead, wherein at least one electrode plate of the positive electrode plate and the negative electrode plate extends relatively longer than the separator at one end of the electrode plate where the electrode tab is located to form the electrode plate extension protruding out of the separator, and wherein the electrode plate extensions of the same polarity are coupled to each other.

22 Claims, 2 Drawing Sheets

(51) Int. Cl.

| | |
|---|---|
| ***H01M 10/0525*** | (2010.01) |
| ***H01M 10/0583*** | (2010.01) |
| ***H01M 10/0585*** | (2010.01) |
| ***H01M 10/0587*** | (2010.01) |
| ***H01M 50/46*** | (2021.01) |
| ***H01M 50/538*** | (2021.01) |

(56) References Cited

U.S. PATENT DOCUMENTS

| | | | | |
|---|---|---|---|---|
| 2008/0070102 | A1 | 3/2008 | Watanabe et al. | |
| 2008/0292952 | A1 | 11/2008 | Yanagihara et al. | |
| 2010/0173194 | A1 | 7/2010 | Fujiya et al. | |
| 2011/0117418 | A1* | 5/2011 | Meintschel | H01M 2/0207 429/153 |
| 2012/0145428 | A1* | 6/2012 | Tokunaga | H01M 4/387 173/217 |
| 2012/0202105 | A1* | 8/2012 | Shinyashiki | H01M 2/22 429/153 |
| 2013/0143109 | A1* | 6/2013 | Kim | H01M 50/54 429/178 |
| 2013/0266845 | A1 | 10/2013 | Kanda et al. | |
| 2013/0286845 | A1 | 10/2013 | Kanda et al. | |

FOREIGN PATENT DOCUMENTS

| | | | |
|---|---|---|---|
| JP | 2008293717 | A | 12/2008 |
| JP | 2015-69918 | A | 4/2015 |
| KR | 10-2004-0099526 | A | 12/2004 |
| KR | 20040099526 | A | 12/2004 |
| KR | 10-2015-0043093 | A | 4/2015 |
| KR | 20150043093 | A | 4/2015 |

* cited by examiner

ELECTRODE ASSEMBLY INCLUDING ELECTRODE PLATES WITH ELECTRODE PLATE EXTENSIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present application *is an application for reissue of U.S. Pat. No. 10,381,628, which* claims priority to Korean Patent Application No. 10-2016-0070419 filed on Jun. 7, 2016 in the Republic of Korea, the disclosures of which are incorporated herein by reference.

The present disclosure relates to an electrode assembly including electrode plates with electrode plate extensions coupled to each other.

BACKGROUND ART

Along with technology development and increased demands for mobile devices, there has been a rapid increase in demand for secondary batteries as energy sources. Among such secondary batteries, lithium secondary batteries, which exhibit high energy density, high operating potential, a long cycle life and a low self-discharging rate, have been commercialized and widely used.

Secondary batteries are classified into a cylindrical or rectangular battery in which an electrode assembly is included in a cylindrical or rectangular metal can and a pouch-type battery in which an electrode assembly is included in a pouch-type case made of an aluminum laminate sheet, depending on the shape of the battery case.

In addition, the electrode assembly included in the battery case is a power generation device capable of charging and discharging, having a laminate structure composed of a positive electrode, a separator and a negative electrode. The electrode assembly is classified into a jelly-roll electrode assembly in which a positive electrode and a negative electrode with an elongated sheet form are rolled with a separator being interposed between them, a stacked electrode assembly in which a plurality of positive and negative electrodes of a predetermined size are sequentially stacked with a separator being interposed therebetween, and a stacked-folded electrode assembly in which stacked unit cells are wound with a separating film. The electrode assembly of the stacked structure and the electrode assembly of the stacked-folded structure have a common feature in that many electrodes are stacked.

Among them, a general structure of the stacked electrode assembly is shown in FIG. 1.

Referring to FIG. 1, a stacked electrode assembly 10 has a laminate structure composed of a positive electrode, a separator and a negative electrode. Positive electrodes 12, 13 and negative electrodes 22 and 23 have positive electrode tabs 14 and 15 and negative electrode tabs 24 and 25 which are formed to protrude outwards, and the positive electrode tabs 14 and 15 and the negative electrode tabs 24 and 25 are formed in mutually opposite directions.

Also, the plurality of positive electrodes 12, 13 and negative electrodes 22, 23 are stacked with a separator 32 being interposed between the positive electrode 12 and the negative electrode 22. In addition, the positive electrode tabs 14, 15 are coupled to a single positive electrode lead 42, and the negative electrode tabs 24 and 25 are coupled to a single negative electrode lead 44.

In this case, the plurality of positive electrode tabs 14 and 15 and the positive electrode lead 42 are generally coupled to each other by welding. Thus, positive electrode tab welding portions 16 are respectively formed at the positive electrode tabs 14 and 15, and negative electrode tab welding portions 26 are respectively formed at the negative electrode tabs 24, 25.

On the other hand, the positive electrode, the separator and the negative electrode are closely adhered to each other by means of lamination without performing welding separately.

Therefore, in the conventional stacked electrode assembly, the positive electrode, the separator and the negative electrode are closely adhered to each other only through lamination, and thus when a lithium secondary battery capable of repeatedly charging and discharging is used for a long period, the thickness of the entire electrode plates varies due to contraction and expansion of the entire electrode plates during charging and discharging.

Specifically, due to repetitive charging and discharging, a swelling phenomenon may occur among the positive electrode, the separator and the negative electrode, which are laminated.

Accordingly, a non-contact region is formed among the positive electrode, the separator and the negative electrode, which are laminated, and a dendrite is generated in the non-contact region. Also, lithium ions are continuously deposited at the site where the dendrite is generated.

In addition, the thickness of the positive electrode and the negative electrode is gradually increased due to the lithium ions continuously deposited at the site where the dendrite is generated, and accordingly a swelling phenomenon among the positive electrode, the separator and the negative electrode becomes worse. This may increase the thickness of the entire battery cell, and, in some cases, a short circuit occurs due to the dendrite.

Therefore, there is a high need for a technique for preventing a swelling phenomenon among the positive electrode, the separator and the negative electrode, which are laminated, in order to prevent the risk of thickness increase and short circuit of a battery cell while ensuring stable operation of the battery cell.

DISCLOSURE

Technical Problem

The present disclosure is designed to solve the problems of the related art and to accomplish the technical object requested from the past.

The inventors of the present disclosure have conducted intensive research and various experiments and found that a swelling phenomenon among a positive electrode, a separator and a negative electrode, which are laminated, can be prevented if electrode plate extensions coupled to each other are formed at electrode plates of an electrode assembly, and then have reached the present disclosure.

Technical Solution

Therefore, an electrode assembly according to the present disclosure has a structure in which a plurality of electrode plates are stacked so that a separator is interposed between a positive electrode plate and a negative electrode plate, wherein each of the electrode plates includes an electrode tab protruding outwards at one side thereof for coupling with an electrode lead, wherein at least one electrode plate of the positive electrode plate and the negative electrode plate extends relatively longer than the separator at one end of the electrode plate where the electrode tab is located to form the electrode plate extension protruding out of the separator, and wherein the electrode plate extensions of the same polarity are coupled to each other.

Accordingly, in the structure where a positive electrode plate, a separator and a negative electrode plate structure are stacked repeatedly, since the electrode plates of the same polarity are firmly coupled to each other by the electrode plate extensions, it is possible to prevent a swelling phenomenon among the positive electrode plate, the separator and the negative electrode plate even though charging and discharging are repeated.

These electrode plate extensions may be formed in a variety of ways, for example, in a notching process of forming electrode tabs at the electrode plate.

The electrode assembly may have a stacked-folded structure in which a plurality of unit cells including at least one positive electrode plate and at least one negative electrode plate are rolled with a separating film, or a laminated-stacked structure in which a plurality of unit cells are stacked with a separator being interposed therein.

In an embodiment, the electrode plate extensions of the same polarity may be coupled to each other by welding, and the welding may be, for example, resistance welding, ultrasonic welding or laser welding, without being limited thereto. Therefore, any method can be used as long as the electrode plate extensions of the same polarity can be coupled.

As described above, the electrode plate extension is formed on at least one electrode plate of the positive electrode plate and the negative electrode plate, and in detail, a positive electrode plate extension and a negative electrode plate extension may be formed at the positive electrode plate and the negative electrode plate, respectively.

In this structure, the positive electrode tab and the negative electrode tab may be formed to protrude outwards from different sides of the electrode assembly to reduce the possibility of contact with the electrode plate extensions having an opposite polarity.

In an embodiment, the positive electrode tab and the negative electrode tab may be formed to protrude outwards at opposite sides of the electrode assembly on the basis of the center of the electrode assembly.

In this structure, the electrode tab may be positioned at the center of the entire electrode plate, based on the width of the electrode plate, and both sides of one end of the electrode plate where the electrode tab protrudes outwards may be classified into a first electrode plate end and a second electrode plate end on the basis of the electrode tab, and the electrode plate extension may be formed on at least one of the first electrode plate end and the second electrode plate end.

In this regard, when the electrode plates are stacked vertically, the electrode plate extension of the positive electrode plates may be formed at the same position so that the electrode plate extensions of the positive electrode plates may be combined entirely, and the electrode plate extensions of the negative electrode plates may be formed at the same position.

In addition, the electrode plate extensions facing each other may be formed in the same shape, but any shape may also be used as long as edges thereof may be superimposed on each other in a vertical direction, and the shape may be changed as selected by a manufacturer and according to the shape of the device.

With respect to the location of the electrode plate extensions, assuming that a left side of the electrode tab is called a first electrode plate end, a right side of the electrode tab may be called a second electrode plate end.

In this case, all of the positive electrode plates may be configured so that all electrode plate extensions are formed at the first electrode plate end or all electrode plate extensions are formed at the second electrode plate end.

Since the electrode plate extensions respectively formed at the positive electrode plates may be entirely formed at the same position and superimposed, the electrode plate extensions of the positive electrode plates may be simultaneously coupled to each other by means of welding or the like.

As described above, when the positive electrode tabs and the negative electrode tabs are located on different sides of the electrode assembly, the possibility of the electrode plate extensions formed at the positive electrode plates to be located close to the electrode plate extensions formed at the negative electrode plates may be greatly reduced.

In an embodiment, in order to more firmly couple the positive electrode plate, the separator and the negative electrode plate, the electrode plate extensions may be formed at the first electrode plate end and the second electrode plate end, respectively.

If the electrode plate extensions are formed at the first electrode plate end and the second electrode plate end at both sides of the electrode tab, a contact area a coupling area between the positive electrode plates may be increased, and accordingly a strong coupling force may be provided between the electrode plates.

In another embodiment, the positive electrode tab and the negative electrode tab may be formed to protrude outwards from the same side of the electrode assembly.

In this structure, the positive electrode tab may be formed at one portion on the same side of the electrode assembly to protrude outwards, and the negative electrode tab is formed at an opposite portion on the same side to protrude outwards.

If the positive electrode tab and the negative electrode tab are formed in this structure, the electrode plate extensions of the positive electrode plate and the negative electrode plate may be positioned between the positive electrode tab and the negative electrode tab when being observed in a horizontal direction.

In this case, when the electrode plates are stacked in a vertical direction, the electrode plate extensions of the positive electrode plates may be formed entirely at the same position and the plate extension positions of the negative electrode plates may be formed entirely at the same position so that the electrode plate extensions of the positive electrode plates may be coupled together.

In addition, in order to achieve electrical insulation between the positive electrode plate and the negative electrode plate, when being observed in a horizontal direction, the electrode plate extensions of the positive electrode plates and the electrode plate extensions of the negative electrode plates may be arranged apart from each other by a predetermined distance to prevent contact between them.

As described above, if the electrode plate extensions of the positive electrode plates and the electrode plate extensions of the negative electrode plates are spaced apart and their corners are overlapped when they are stacked in a vertical direction, the electrode plate extensions of the positive electrode plates and the electrode plate extensions of the negative electrode plates may have any shape.

On occasions, the electrode plate extensions of the electrode plates may be subjected to an insulation treatment such as adhesion of an insulation sheet, coating of an insulating material, or the like, in order to fundamentally prevent an electrical short circuit.

In an embodiment, a size of the electrode plate extension may be 1% to 20% of on a planar area of the electrode plate.

If the size of the electrode plate extension is less than 1%, the welding area is not easy because an area for coupling the electrode plate extensions is narrow, which may not meet a coupling force desired by a manufacturer. On the contrary, if the size of the electrode plate extension is greater than 20%, the size of the electrode plate extension where the electrode active material is not coated is too large as compared with the area of the electrode plate, which may reduce the energy density of the battery, and the size of the electrode assembly may be increased due to the volume occupied by the electrode plate extensions.

In an embodiment, a width of the electrode plate extension may be 100% to 500% of a width of the electrode tab.

If the width of the electrode plate extension is less than 100% based on the width of the electrode tab, it is not easy to perform the welding operation because the area for coupling the electrode plate extensions is small, which may not meet a coupling force desired by a manufacturer. On the contrary, if the width of the electrode plate extension exceeds 500% of the width of the electrode tab, the width of the electrode plate extension may exceed the width of the electrode plate, undesirably, when the width of the electrode tab and the width of the electrode plate are taken into consideration.

In an embodiment, a length of the electrode plate extension extending relatively longer than the separator may be 5% to 50% of a length of the electrode tab.

If the length of the electrode plate extension is less than 5% based on the length of the electrode tab, the area for coupling the electrode plate extensions becomes inevitably narrowed, which may not meet a coupling force desired by a manufacturer. On the contrary, if the length of the electrode plate extension is formed to exceed 50% based on the length of the electrode tab, the battery energy density may be reduced since a region not contributing to the battery capacity becomes excessively large, and the size of the electrode assembly may be increased due to the volume occupied by the electrode plate extensions, undesirably.

The present disclosure also provides a battery cell comprising the electrode assembly and a device comprising at least one battery cell as above. The structure of the battery cell and the device as well as their manufacturing methods are well known in the art and thus not described in detail here.

Advantageous Effects

As described above, the electrode assembly including the electrode plates with electrode plate extensions coupled to each other according to the present disclosure may prevent a swelling phenomenon among the positive electrode plate, the separator and the negative electrode plate even during repetitive charging and discharging processes, and thus it is possible to suppress a dendrite phenomenon and accordingly prevent the increase in thickness of the battery cell and the possibility of a short circuit.

BEST MODE

Hereinafter, an embodiment of the present disclosure will be described in detail with reference to the accompanying drawings, but the scope of the present disclosure is not limited thereto.

Figure 1:
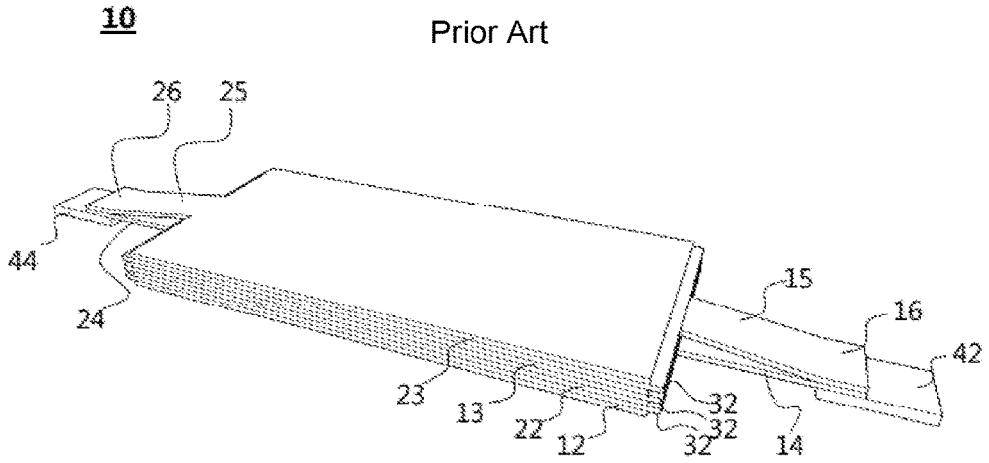
FIG. 1 is a perspective view showing a general structure of an electrode assembly of a stacked structure.
Figure 2:
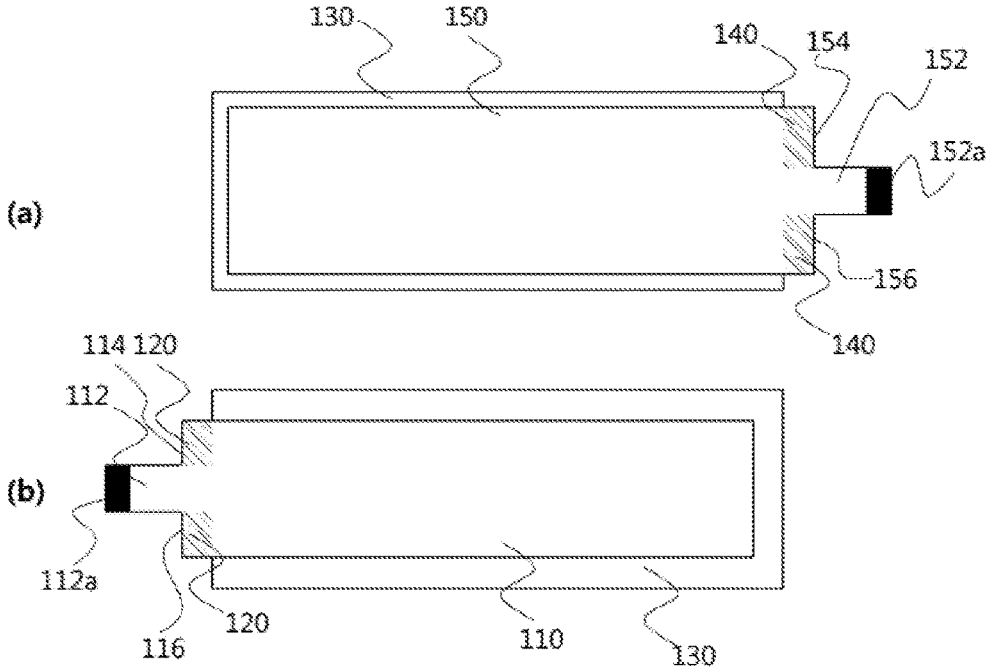
FIG. 2 is a diagram showing a structure composed of a positive electrode plate and a separator and a structure composed of a negative electrode plate and a separator, where electrode plate extensions are formed according to an embodiment of the present disclosure.

FIG. 2 is a diagram showing (a) a structure composed of a positive electrode plate and a separator and (b) a structure composed of a negative electrode plate and a separator, where electrode plate extensions are formed according to an embodiment of the present disclosure.

Regarding an electrode assembly in which a positive electrode plate 110, a separator 130 and a negative electrode plate 150 are repetitively stacked, FIG. 2a shows a structure where the single negative electrode plate 150 is stacked on the single separator 130, and FIG. 2b shows a structure where the single positive electrode plate 110 is stacked on the single separator 130.

At this time, in order to prevent an electric short circuit caused by the contact between positive electrode plates and negative electrode plates, which are repetitively stacked, the size of the separator 130 is generally greater than the size of the positive electrode plate 110 and the negative electrode plate 150.

Referring to FIG. 2, a positive electrode tab 112 and a negative electrode tab 152 are respectively formed at the positive electrode plate 110 and the negative electrode plate 150 to protrude out of the separator 130 for coupling with an electrode lead (not shown).

The positive electrode tab 112 and the negative electrode tab 152 are formed at opposite sides of the separator 130, and an electrode lead coupling portion 112a is respectively formed at ends of the positive electrode tab 112 and the negative electrode tab 152 for coupling with an electrode lead (not shown).

At this time, based on the positive electrode tab 112 protruding outwards, one end of the positive electrode plate 110 is composed of a first electrode plate end 114 and a second electrode plate end 116. Electrode plate extensions 120 is respectively formed at the first electrode plate end 114 and the second electrode plate end 116 to extend relatively longer than the separator 130 so as to protrude and expose out of the separator 130.

The electrode plate extensions 120 formed at both sides based on the positive electrode tab 112 are coupled to electrode plate extensions (not shown) of upper and lower positive electrode plates which face each other.

Similarly, one end of the negative electrode plate 150 is also composed of a first electrode plate end 154 and a second electrode plate end 156 on the basis of the negative electrode tab 152 protruding outwards. Electrode plate extensions 140 are respectively formed at the first electrode plate end 154 and the second electrode plate end 156 to extend relatively longer than the separator 130 so as to protrude and expose out of the separator 130.

The electrode plate extensions 140 formed at the negative electrode plate 150 are also coupled to the electrode plate extensions of the upper and lower negative electrode plates to face each other, similar to the electrode plate extensions 120 formed at the positive electrode plate.

Figure 3:
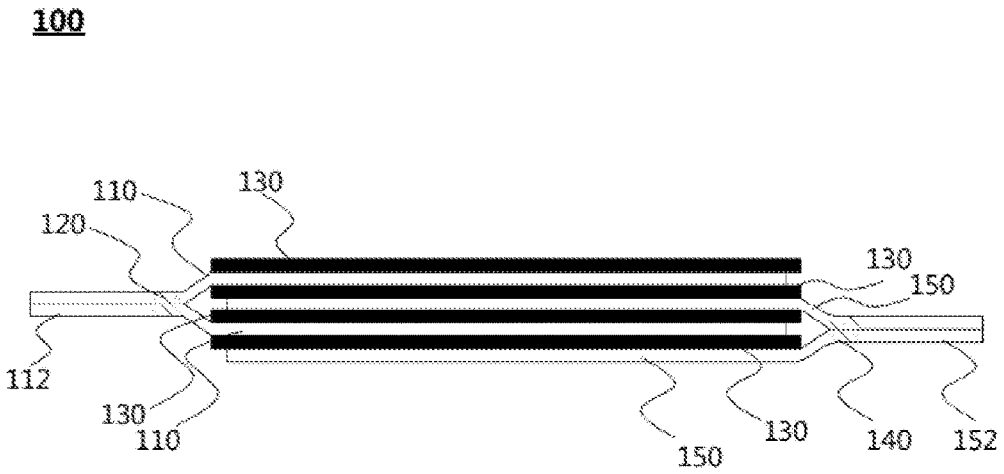
FIG. 3 is a diagram showing an electrode assembly including electrode plates with electrode plate extensions coupled to each other according to an embodiment of the present disclosure.

FIG. 3 is a diagram showing an electrode assembly including electrode plates with electrode plate extensions coupled to each other according to an embodiment of the present disclosure.

Referring to FIG. 3, the negative electrode plate 150 and the positive electrode plate 110 are alternately stacked in the order of a negative electrode plate, a separator and a positive electrode plate, and the separator 130 is interposed between the negative electrode plate 150 and the positive electrode plate 110. This may be understood from the structure where a separator and a negative electrode plate are stacked and the structure where a separator and a positive electrode plate are stacked as shown in FIGS. 2a and 2b.

The positive electrode tab 112 and the negative electrode tab 152 are formed at opposite sides of the electrode assembly 100 based on the center of the electrode assembly 100.

As shown in FIG. 3, the electrode plate extensions 120 and 140 are respectively formed at the positive electrode plate 110 and the negative electrode plate 150, the electrode plate extensions 120 of the positive electrode plates, which face each other, are coupled to each other, and the electrode plate extensions 140 of the negative electrode plates, which face each other, are coupled to each other.

The electrode plate extensions 120 and 140 formed respectively at the positive electrode plate 110 and the negative electrode plate 150 have the same shape. In some cases, the electrode plate extensions 120, 140 may be shaped to coincide with each other when they are bent by pressure for mutual coupling.

Figure 4:
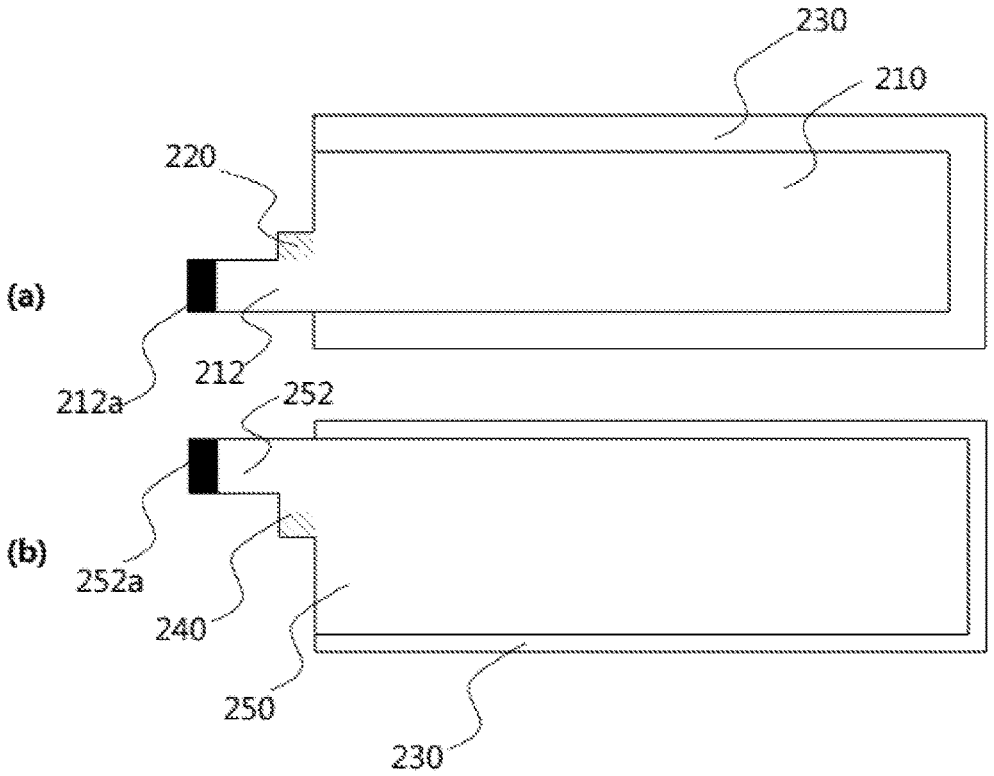
FIG. 4 is a diagram showing a structure of a positive electrode plate and a separator and a structure of a negative electrode plate and a separator, where electrode plate extensions are formed according to an embodiment of the present disclosure.

FIG. 4 is a diagram showing (a) a structure of a positive electrode plate and a separator and (b) a structure of a negative electrode plate and a separator, where electrode plate extensions are formed according to another embodiment of the present disclosure.

Referring to FIG. 4, different from the structure composed of a separator and a negative electrode plate and the structure composed of a separator and a positive electrode plate shown in FIG. 2, the positive electrode tab 212 formed at the positive electrode plate 210 and the negative electrode tab 252 formed at the negative electrode plate 250 are formed to protrude outwards from the same side of the electrode assembly, and electrode lead coupling portions 212a, 252a are formed at ends of the positive electrode tab 212 and the negative electrode tab 252, respectively, for coupling with electrode leads (not shown).

The electrode plate extensions 220, 240 of the positive electrode plate and the negative electrode plate are also formed to protrude outwards from the same side of the electrode assembly.

Specifically, after the electrode plates 210, 250 are stacked, when being observed in a horizontal direction, the electrode plate extensions 220, 240 of the positive electrode plate and the negative electrode plate are positioned between the positive electrode tab 212 and the negative electrode tab 252, and the electrode plate extensions 220 of the positive electrode plate and the electrode plate extensions 240 of the negative electrode plate, which are stacked to face each other in a vertical direction, are coupled to each other by means of welding.

Though not shown in FIG. 4, the electrode plate extensions 220, 240 of the electrode plates, which are stacked in a vertical direction, may also be formed so that the electrode plate extensions 220 of the positive electrode plate face themselves and the electrode plate extensions 240 of the negative electrode plate face themselves.

At this time, the electrode plate extension 220 of the positive electrode plate and the electrode plate extension 240 of the negative electrode plate are spaced apart from each other by a predetermined distance in order to prevent an electrical short, and accordingly the electrode plate extension 220 of the negative electrode plate and the electrode plate extension 240 are formed not to be in contact with each other.

Various changes and modifications can be made based on the above disclosure within the scope of the present disclosure by those having ordinary skill in the art.

What is claimed is:

1. An electrode assembly comprising a plurality of stacked electrode plates including a plurality of positive electrode plates and a plurality of negative electrode plates and a plurality of separators, each separator being interposed between one of the positive electrode plates and one of the negative electrode plates, wherein each of the electrode plates includes an electrode tab protruding outwards at one side thereof, the electrode tab including an electrode lead coupling portion for coupling with an electrode lead, wherein each [positive electrode plate and each negative] *of a plurality of at least one of the positive or negative* electrode [plate extend] *plates extends* relatively longer than the [respective separator] *plurality of separators* at one end of the respective electrode plate where the respective electrode tab is located*, so as* to form [an] *a respective* electrode plate extension protruding out [of] *beyond* the [separator] *plurality of separators along a respective protruding direction, wherein each of the electrode plate extensions has a respective one of the electrode tabs extending therefrom along the respective protruding direction, each of the electrode plate extensions and each of the respective electrode tabs having a width orthogonal to the respective protruding direction, the width of each electrode plate extension being larger than the width of the respective electrode tab,* wherein each separator has a greater width than each of the respective positive and negative electrode plates, and wherein the electrode plate extensions of a same polarity [extend at an angle towards] *converge at an acute angle relative to* each other [and extend parallel to] *while extending along* a longitudinal direction of the electrode assembly[to form a Y-shape], and the electrode plate extensions of the same polarity are coupled to each other.

2. The electrode assembly according to claim 1, wherein the plurality of stacked electrode plates are stacked sequentially.

[3. The electrode assembly according to claim 1, wherein the electrode assembly has a stacked-folded structure in which a plurality of unit cells including at least one positive electrode plate and at least one negative electrode plate are rolled with a separating film, or a laminated-stacked structure in which a plurality of unit cells are stacked with a separator being interposed therein.]

4. The electrode assembly according to claim 1, wherein the electrode plate extensions of the same polarity are coupled to each other by welding.

5. The electrode assembly according to claim 1, wherein both sides of one end of the electrode plate where the electrode tab protrudes outwards are classified into a first electrode plate end and a second electrode plate end on the basis of the electrode tab, and the electrode plate extension is formed on at least one of the first electrode plate end and the second electrode plate end.

6. The electrode assembly according to claim 5, wherein one of the electrode plate extensions is formed at the first electrode plate end and the second electrode plate end, respectively.

7. The electrode assembly according to claim 1, wherein a size of each electrode plate extension is 1% to 20% of a planar area of the electrode plate.

8. The electrode assembly according to claim 1, wherein a width of each electrode plate extension is 100% to 500% of a width of the electrode tab.

9. The electrode assembly according to claim 1, wherein a length of each electrode plate extension extending relatively longer than the separator is 5% to 50% of a length of the electrode tab.

[10. The electrode assembly according to claim 1, wherein a positive electrode plate extension and a negative electrode plate extension are respectively formed at the positive electrode plate and the negative electrode plate.]

11. The electrode assembly according to claim 1, wherein the positive electrode tab and the negative electrode tab protrude outwards at different sides of the electrode assembly.

12. The electrode assembly according to claim 11, wherein the positive electrode tab and the negative electrode tab protrude outwards at opposite sides of the electrode assembly on the basis of the center of the electrode assembly.

13. A battery cell, comprising the electrode assembly defined in claim 1.

14. A device, comprising at least one of the battery cell defined in claim 13.

*15. The electrode assembly according to claim 1, wherein the electrode tabs protruding outwards from the positive electrode plates and the electrode tabs protruding outwards from the negative electrode plates protrude outwards from the same side of the electrode assembly.*

*16. An electrode assembly comprising a plurality of planar electrode plate portions stacked along a stacking axis, the plurality of planar electrode plate portions including a plurality of positive planar electrode plate portions, a plurality of negative planar electrode plate portions, and a plurality of separator portions, each separator portion being interposed between one of the positive planar electrode plate portions and one of the negative planar electrode plate portions,*

*wherein each of the planar electrode plate portions includes an electrode tab protruding outwards at one side thereof, the electrode tab including an electrode lead coupling portion for coupling with an electrode lead,*

*wherein each of a plurality of at least one of the positive or negative planar electrode plate portions extends relatively longer than the plurality of separator portions at one end of the respective planar electrode plate portion where the respective electrode tab is located, so as to form a respective electrode plate extension protruding out beyond the plurality of separator portions along a respective protruding direction, wherein each of the electrode plate extensions has a respective one of the electrode tabs extending therefrom along the respective protruding direction, each of the electrode plate extensions and each of the respective electrode tabs having a width orthogonal to the respective protruding direction, the width of each electrode plate extension being larger than the width of the respective electrode tab,*

*wherein each separator portion extends further in a width direction than each of the respective positive and negative planar electrode plate portions, and*

*wherein the electrode plate extensions of a same polarity converge at an acute angle relative to each other while extending along a lateral direction of the electrode assembly, the lateral direction being orthogonal to the stacking axis.*

*17. The electrode assembly according to claim 16, wherein a size of each electrode plate extension is 1% to 20% of a planar area of the respective planar electrode plate portion.*

*18. The electrode assembly according to claim 16, wherein a width of each electrode plate extension is 100% to 500% of a width of the respective electrode tab.*

*19. The electrode assembly according to claim 16, wherein the electrode tabs protruding outwards from the positive planar electrode plate portions and the electrode tabs protruding outwards from the negative planar electrode plate portions protrude outwards from the same side of the electrode assembly.*

*20. A battery cell, comprising the electrode assembly defined in claim 16.*

*21. A device, comprising at least one of the battery cell defined in claim 20.*

*22. The electrode assembly according to claim 16, wherein the electrode plate extensions of the same polarity are coupled to each other.*

*23. The electrode assembly according to claim 22, wherein the electrode plate extensions of the same polarity are electrically coupled to each other.*

*24. The electrode assembly according to claim 22, wherein the electrode plate extensions of the same polarity are welded to each other.*

* * * * *